(12) United States Patent
Ohta et al.

(10) Patent No.: US 7,066,295 B2
(45) Date of Patent: Jun. 27, 2006

(54) VEHICLE STEERING APPARATUS AND CONTROL METHOD THEREFOR

(75) Inventors: Takayuki Ohta, Okazaki (JP); Minekazu Momiyama, Chiryu (JP); Hiroaki Kato, Hekinan (JP)

(73) Assignee: Toyoda Koki Kabushiki Kaisha, Kariya (JP)

(*) Notice: Subject to any disclaimer, the term of this patent is extended or adjusted under 35 U.S.C. 154(b) by 0 days.

(21) Appl. No.: 11/139,695

(22) Filed: May 31, 2005

(65) Prior Publication Data

US 2005/0273235 A1  Dec. 8, 2005

(30) Foreign Application Priority Data

Jun. 3, 2004 (JP) ............... 2004-165535

(51) Int. Cl.
  *B62D 5/00* (2006.01)
  *B62D 137/00* (2006.01)

(52) U.S. Cl. ............... 180/422; 180/446; 701/42

(58) Field of Classification Search ........... 180/421, 180/422, 443, 446; 701/41, 42
See application file for complete search history.

(56) References Cited

U.S. PATENT DOCUMENTS

| | | | |
|---|---|---|---|
| 5,373,911 A * | 12/1994 | Yasui | 180/168 |
| 6,640,923 B1 | 11/2003 | Dominke et al. | |
| 6,931,313 B1 * | 8/2005 | Kato et al. | 701/41 |
| 2004/0107032 A1 * | 6/2004 | Farrelly et al. | 701/42 |
| 2005/0125131 A1 * | 6/2005 | Kato et al. | 701/70 |
| 2005/0209751 A1 * | 9/2005 | Kato | 701/41 |
| 2005/0222731 A1 * | 10/2005 | Ghoneim | 701/41 |

FOREIGN PATENT DOCUMENTS

| | | |
|---|---|---|
| DE | 101 60 716 A1 | 6/2003 |
| EP | 1 514 765 A2 | 3/2005 |
| EP | 1 577 194 A1 | 9/2005 |
| EP | 1 584 544 A2 | 10/2005 |
| JP | 2002-254964 | 9/2002 |
| JP | 2004-1590 | 1/2004 |

* cited by examiner

*Primary Examiner*—Kevin Hurley
(74) *Attorney, Agent, or Firm*—Oblon, Spivak, McClelland, Maier & Neustadt, P.C.

(57) ABSTRACT

When a variable value indicates that a steering characteristic is understeer, a control unit controls a variable transmission ratio device to change a second steering angle such that the greater the understeer indicated by the variable value, the smaller the steering angle of steered wheels relative to the turning angle of a steering wheel becomes. When the differentiated value of the variable value indicates that the understeer is changing to increase, a correction unit corrects the variable value such that the greater the degree of change of the understeer indicated by the differentiated value, the greater the understeer indicated by the variable value becomes. Hence, the attitude of a vehicle in understeer is stabilized with a simple configuration.

7 Claims, 11 Drawing Sheets

VEHICLE STEERING APPARATUS AND CONTROL METHOD THEREFOR

CROSS-REFERENCE TO RELATED APPLICATIONS

This application is based upon and claims the benefit of priority from prior Japanese Patent Application No. 2004-165535, filed on Jun. 3, 2004, the entire contents of which are incorporated herein by reference.

BACKGROUND OF THE INVENTION

The present invention relates to a vehicle steering apparatus and a control method for the apparatus.

In recent years, steering control systems have been proposed which control the steering angle of steered wheels for controlling the yaw moment of a vehicle based on a vehicle model (vehicle motion model) obtained by modeling the relationship between the motion state of the vehicle and the vehicle state quantities such as the vehicle speed and the yaw rate (for example, Japanese Laid-Open Patent Publication No. 2002-254964). One of such steering control systems is the intelligent front steering (IFS) system.

The IFS system executes an integrated electronic control related to steered wheels, such as variable gear ratio control, in which the transmission ratio (gear ratio), which is the ratio of the steering angle of the steered wheels to the turning angle of the steering wheel (steering wheel turning angle), is varied based on the vehicle state quantities. The IFS system determines the steering characteristic of the vehicle based on vehicle model calculation, and controls the steering angle of the steered wheels to stabilize the attitude of the vehicle according to the steering characteristic.

For example, when the vehicle is in understeer, the steered wheels are controlled such that the actual steering angle by which the steered wheels are steered is reduced (understeer control). Thus, the vehicle attitude is stabilized on a low μ road, on which the vehicle attitude is likely to be unstable (for example, refer to Japanese Laid-Open Patent Publication No. 2004-1590).

The vehicle steering apparatus disclosed in Japanese Laid-Open Patent Publication No. 2004-1590 determines whether the understeer control should be executed based on the degree of grip of the steered wheels. However, when estimating the degree of grip of the steered wheels, the steering torque must be detected. Thus, hydraulic power steering apparatuses, which are widely used, need to be equipped with a torque sensor that electrically detects the steering torque. This complicates the configuration and increases the manufacturing costs.

SUMMARY OF THE INVENTION

Accordingly, it is an objective of the present invention to provide a vehicle steering apparatus and a method for controlling the apparatus that stabilize the attitude of a vehicle in understeer with a simple configuration.

To achieve the above-mentioned objective, the present invention provides a vehicle steering apparatus for changing a steering angle of steered wheels according to turning of a steering wheel. The apparatus includes a variable transmission ratio device having a motor for steering the steered wheels. The steering angle of the steered wheels is determined by superimposing a first steering angle based on a turning angle of the steering wheel and a second steering angle based on the activation of the motor on each other. The variable transmission ratio device adjusts the second steering angle, thereby changing the ratio of the steering angle of the steered wheels to the turning angle of the steering wheel. A calculation unit calculates a variable value that continuously changes in accordance with a steering characteristic of the vehicle, based on any one of a difference value between an actual yaw rate and a target yaw rate, a difference value between an actual slip angle and a target slip angle, and a difference value between a front wheel slip angle and a rear wheel slip angle. When the variable value indicates that the steering characteristic is understeer, a control unit controls the variable transmission ratio device to change the second steering angle such that the greater the understeer indicated by the variable value, the smaller the steering angle of the steered wheels relative to the turning angle of the steering wheel becomes. When the differentiated value of the variable value indicates that the understeer is changing to increase, a correction unit corrects the variable value such that the greater the degree of change of the understeer indicated by the differentiated value, the greater the understeer indicated by the variable value becomes.

The present invention further provides a method for controlling a vehicle steering apparatus having a motor for changing a steering angle of steered wheels according to turning of a steering wheel. The method includes determining the steering angle of the steered wheels by superimposing a first steering angle based on a turning angle of the steering wheel and a second steering angle based on the activation of the motor on each other; adjusting the second steering angle for changing the ratio of the steering angle of the steered wheels to the turning angle of the steering wheel. The method further includes calculating a variable value that continuously changes in accordance with the steering characteristic of the vehicle, based on any one of a difference value between an actual yaw rate and a target yaw rate, a difference value between an actual slip angle and a target slip angle, and a difference value between a front wheel slip angle and a rear wheel slip angle. The method further includes changing, when the variable value indicates that the steering characteristic is understeer, the second steering angle such that the greater the understeer indicated by the variable value, the smaller the steering angle of the steered wheels relative to the turning angle of the steering wheel becomes; and correcting, when the differentiated value of the variable value indicates that the understeer is changing to increase, the variable value such that the greater the degree of change of the understeer indicated by the differentiated value, the greater the understeer indicated by the variable value becomes.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Hereinafter, a vehicle steering apparatus according to one embodiment of the present invention will be described. The vehicle steering apparatus is provided with a variable gear ratio system.

Figure 1:
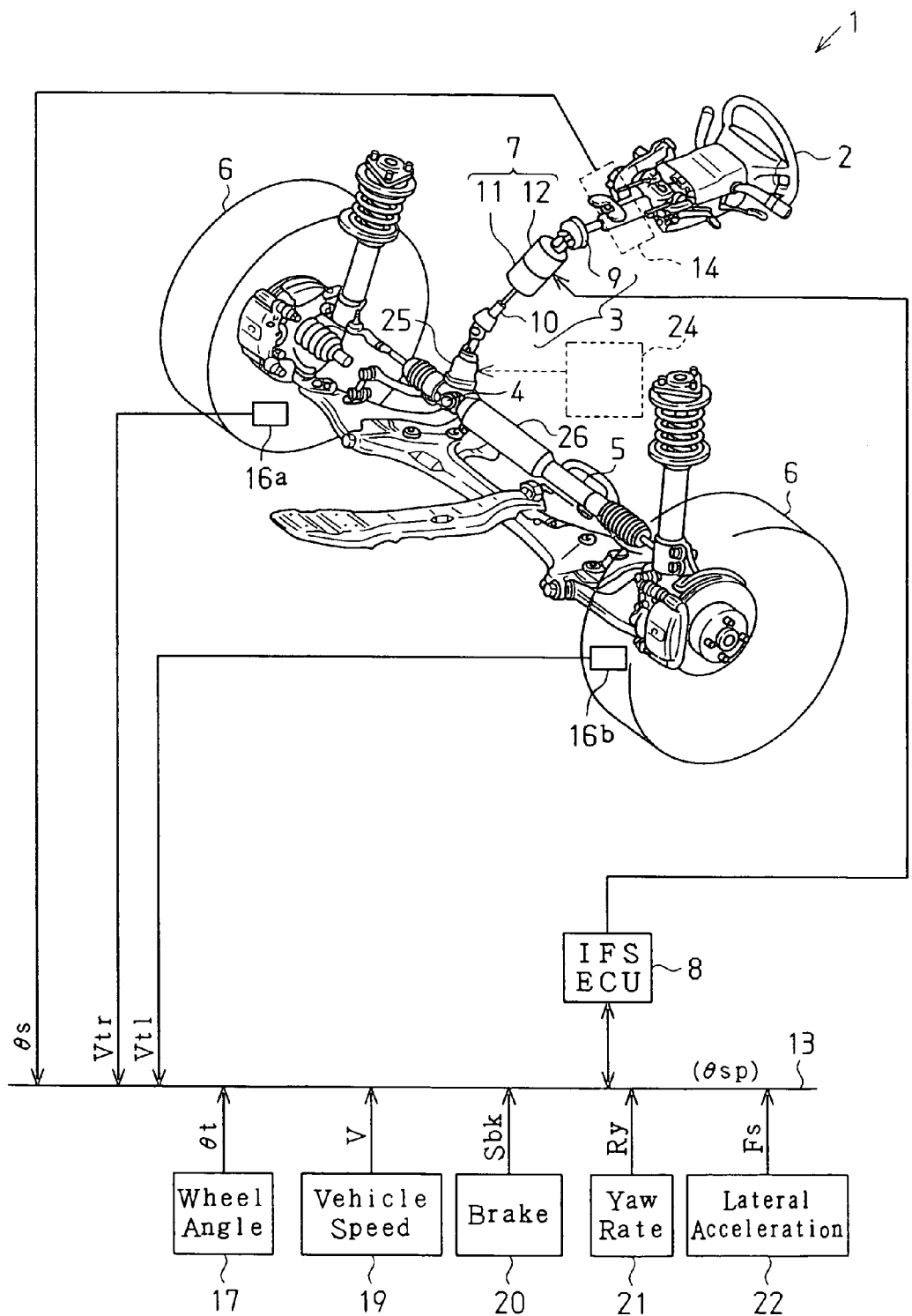
FIG. 1 is a schematic view illustrating a steering apparatus according to one embodiment of the present invention.

FIG. 1 is a schematic view illustrating a steering apparatus according to the present embodiment. As shown in FIG. 1, a steering shaft unit 3, to which a steering wheel 2 is secured, is connected to a rack 5 with a rack-and-pinion mechanism 4. Rotation of the steering shaft unit 3 caused by steering is converted into linear reciprocation of the rack 5 by means of the rack-and-pinion mechanism 4. According to the linear reciprocation of the rack 5, the steering angle of steered wheels 6, that is, the wheel angle, is changed. This in turn changes the traveling direction of the vehicle.

In the present embodiment, the steering apparatus 1 includes a variable gear ratio actuator 7 and an ECU (IFSECU) 8. The variable gear ratio actuator 7 functions as a variable transmission ratio device for changing the transmission ratio (gear ratio) of the steered wheels 6 to the turning angle (steering wheel turning angle) of the steering wheel 2. The ECU 8 functions as a controller, or a control unit for controlling actuation of the variable gear ratio actuator 7.

Specifically, the steering shaft unit 3 includes a first shaft 9 to which the steering wheel 2 is coupled and a second shaft 10 to which the rack-and-pinion mechanism 4 is coupled. The variable gear ratio actuator 7 includes a differential mechanism 11 that couples the first shaft 9 and the second shaft 10 to each other and a motor 12 for driving the differential mechanism 11. The variable gear ratio actuator 7 adds rotation caused by the motor 12 to rotation of the first shaft 9 caused by steering operation, and transmits the resultant to the second shaft 10, thereby increasing (or reducing) the rotation of the steering shaft unit 3 transmitted to the rack-and-pinion mechanism 4.

Figure 2:
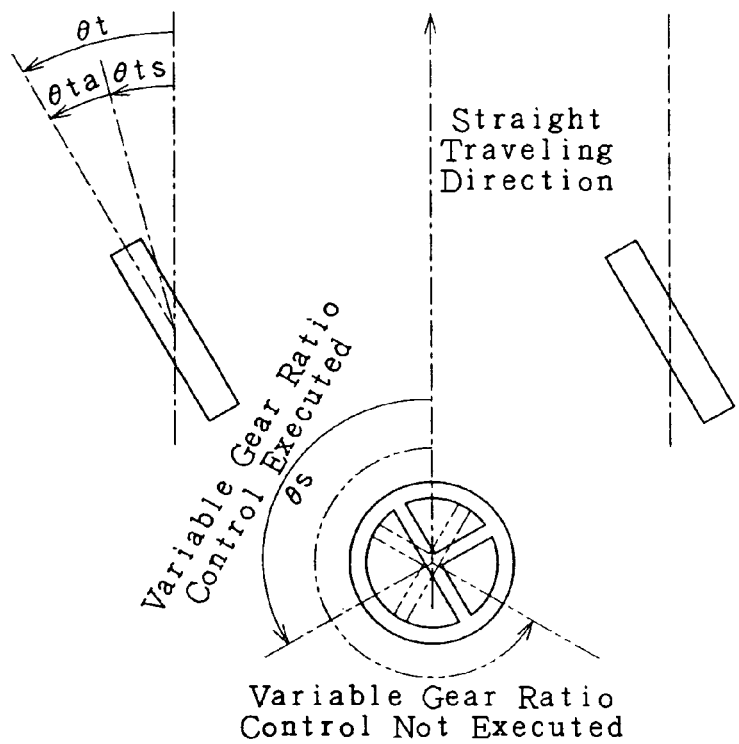
FIG. 2 is a diagram showing a variable gear ratio control executed by the apparatus shown in FIG. 1.
Figure 3:
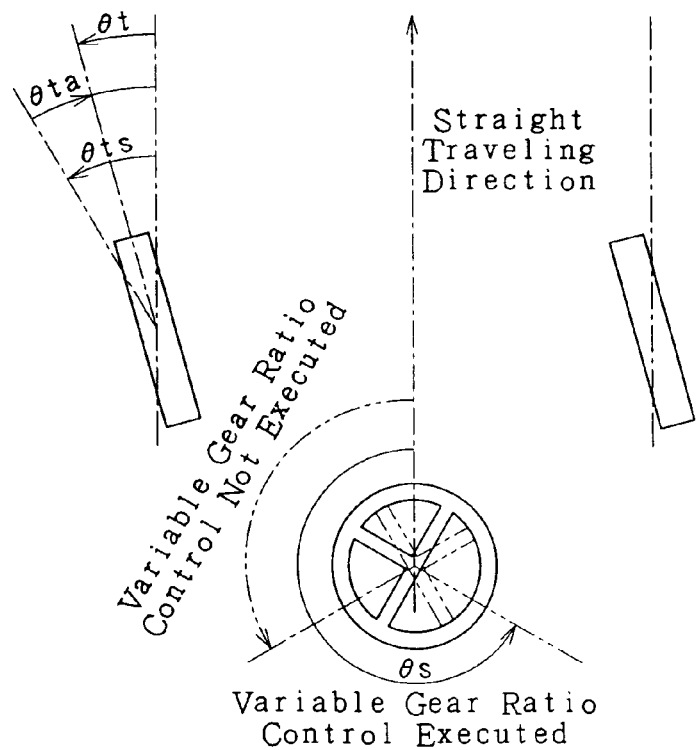
FIG. 3 is a diagram showing a variable gear ratio control executed by the apparatus shown in FIG. 1.

That is, as shown in FIGS. 2 and 3, the variable gear ratio actuator 7 adds a steering angle (ACT angle θta) of the steered wheels 6 based on the activation of the motor 12 to the steering angle (basic steering angle θts) of the steered wheels 6 based on the steering operation, thereby changing the gear ratio of the steered wheels 6 to the turning angle θs of the steering wheel 2. The ECU 8 controls the variable gear ratio actuator 7 by controlling the activation of the motor 12. That is, the ECU controls the ACT angle θta, thereby changing the gear ratio of the steered wheels 6 (variable gear ratio control).

To "add rotation" refers not only to a case where addition of rotation angles is performed but also to a case where subtraction of rotation angles is performed. Also, when "the gear ratio of the steered wheels 6 to the steering wheel turning angle θs" is expressed as an overall gear ratio (steering wheel turning angle θs/wheel angle θt), if the ACT angle θta that is in the same direction as the basic steering angle θts is added to the basic steering angle θts, the overall gear ratio is reduced (wheel angle θt is increased, see FIG. 2). If the ACT angle θta that is in the reverse direction to the basic steering angle θts is added to the basic steering angle θts, the overall gear ratio is increased (wheel angle θt is reduced, see FIG. 3). In the present embodiment, the basic steering angle θts corresponds to a first steering angle, and the ACT angle θta corresponds to a second steering angle.

In the present embodiment, the ECU 8 is connected to a controller area network (CAN) 13. The controller area network 13 is connected to sensors for detecting vehicle state quantities. Specifically, the controller area network 13 is connected to a steering wheel turning angle sensor 14, vehicle wheel speed sensors 16a, 16b, a wheel angle sensor 17, a vehicle speed sensor 19, a brake sensor 20, a yaw rate sensor 21, a lateral acceleration (lateral G) sensor 22. The vehicle state quantities detected by the sensors, or the steering wheel turning angle θs, the vehicle wheel speeds Vtr, Vtl, the wheel angle θt, the vehicle speed V, a brake signal Sbk, the vehicle yaw rate Ry, the lateral acceleration Fs are inputted to the ECU 8 through the controller area network 13. In the present embodiment, a slip angle θsp is detected based on the yaw rate Ry and the lateral acceleration Fs. The slip angle θsp refers to a deviation of the orientation of the vehicle body with respect to the traveling direction, or the slip angle of the vehicle body. Based on the vehicle state quantities inputted through the controller area network 13, the ECU 8 executes the variable gear ratio control.

The steering apparatus 1 of the present embodiment is a hydraulic power steering apparatus. A hydraulic pump 24 pressurizes and sends fluid to a power cylinder 26 at the rack 5 via a rotary valve 25 provided at a torsion bar (not shown) located at the proximal portion of the steering shaft unit 3. The pressure of the fluid supplied to the power cylinder 26 (hydraulic pressure) pushes the rack 5 in the moving direction of the fluid, so that assisting force is applied to the steering system.

Next, the electrical configuration of the steering apparatus 1 and the control of the apparatus 1 will be described.

Figure 4:
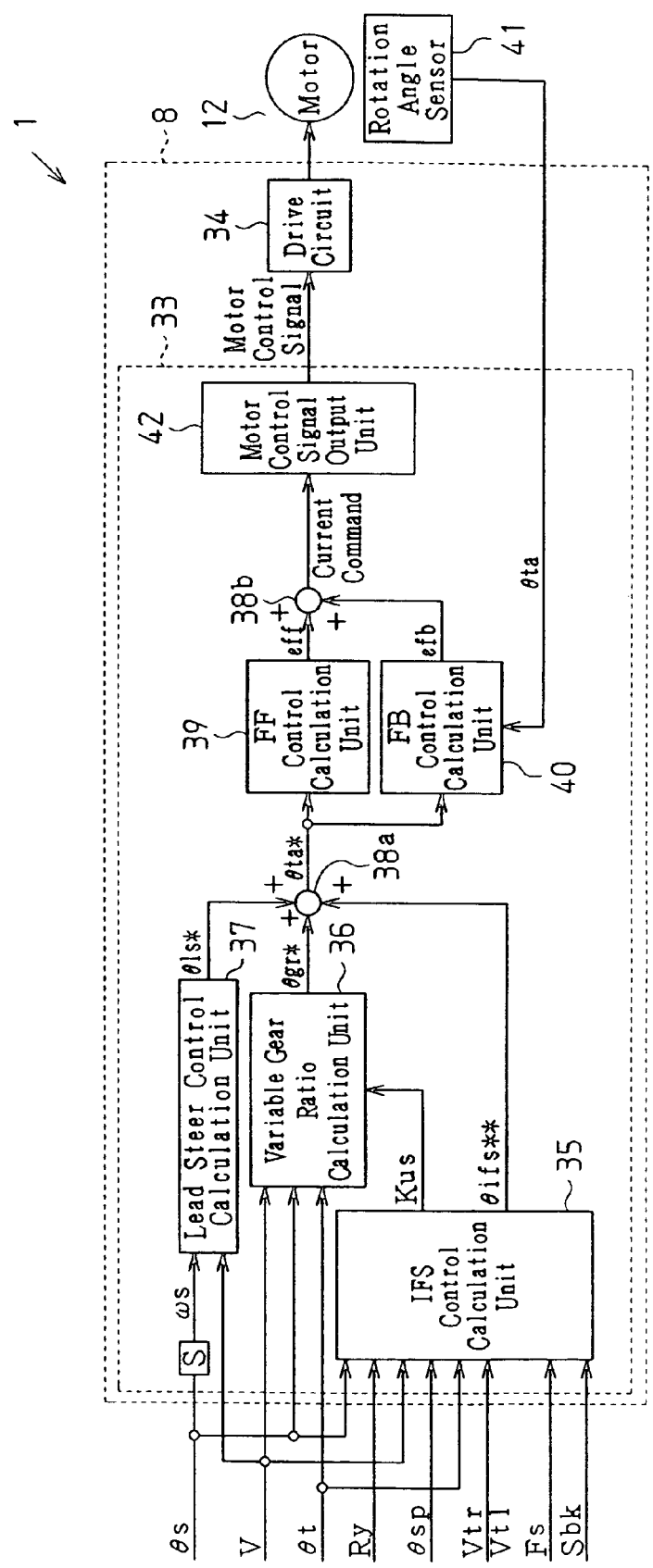
FIG. 4 is a control block diagram showing the steering apparatus of FIG. 1.

FIG. 4 is a control block diagram showing the steering apparatus 1 of the present embodiment. As shown in FIG. 4, the ECU 8 has a microcomputer 33 that outputs a motor control signal, and a drive circuit 34 that supplies power to the motor based on the motor control signal. Each of the control blocks described below is realized in computer programs executed by the microcomputer 33.

In the present embodiment, the motor 12, which drives the variable gear ratio actuator 7, is a brushless motor. The drive circuit 34 supplies power of three phases (U, V, W) to the motor 12 based on the inputted motor control signal.

The microcomputer 33 has a IFS control calculation unit 35, a variable gear ratio calculation unit 36, a LeadSteer control calculation unit 37, which compute a target element and a control signal of the ACTangle θta based on the inputted vehicle state quantities.

Specifically, the IFS control calculation unit 35 receives the steering wheel turning angle θs, the wheel speeds Vtr, Vtl, the wheel angle θt, the slip angle θsp, the vehicle speed V, the brake signal Sbk, the yaw rate Ry, and the lateral acceleration Fs. Based on these vehicle state quantities, the IFS control calculation unit 35 computes a control target element and a control signal of the ACT angle eta. Specifically, the IFS control calculation unit 35 computes an IFS_ACT command angle θifs as a control target element of the ACTangle θta to stabilize the attitude of the vehicle by controlling the yaw moment of the vehicle. The IFS control calculation unit 35** also computes control signals such as a US control variable gear ratio gain Kus, a driver steering state, and an OS/US characteristic value (IFS control calculation).

The attitude of the vehicle in the yaw direction is expressed as the steering characteristic. The steering characteristic refers to a characteristic related to the difference between a vehicle turning angle expected by a driver and the actual vehicle turning angle when the driver performs steering operation. The vehicle turning angle can be referred to as the vehicle traveling direction when the vehicle is constantly turning. A state where the actual turning angle is greater than the expected turning angle is referred to as oversteer (OS). A state where the actual turning angle is less than the expected turning angle is referred to as understeer (US). A state where there is no difference between the turning angles is referred to as neutral steer (NS). The vehicle turning angle expected by the driver may be replaced by a theoretical value in the vehicle model.

In the present embodiment, when the steering characteristic is oversteer, the IFS control calculation unit 35 calculates an IFS_ACT command value θifs as a control target element of the ACT angle θta for applying a steering angle in the opposite direction (counter steer) to the direction of the yaw moment to the steered wheels 6 (oversteer control). When the steering characteristic is understeer, the IFS control calculation unit 35 calculates a US control variable gear ratio gain Kus for reducing the actual steering angle (wheel angle θt) of the steered wheels 6** (understeer control).

The variable gear ratio calculation unit 36 receives the steering wheel turning angle θs, the wheel angle θt, the vehicle speed V, and the US control variable gear ratio gain Kus calculated by the IFS control calculation unit 35. Based on these vehicle state quantities (and the control signal), the variable gear ratio calculation unit 36 computes a variable gear ratio ACT command angle θgr* as a control target element for changing the gear ratio according to the vehicle speed V.

In the present embodiment, when the steering characteristic is understeer, the variable gear ratio ACT command angle θgr* is calculated such as the actual steering angle (wheel angle θt) of the steered wheels 6 based on the US control variable gear ratio gain Kus.

The LeadSteer control calculation unit 37 receives the vehicle speed V and the steering wheel turning speed ωs. The steering wheel turning speed ωs is calculated by differentiating the steering wheel turning angle θs (the same applies in the following). Based on the vehicle speed V and the steering wheel turning speed ωs, the LeadSteer control calculation unit 37 computes an LS_ACT command angle θls* as a control target element for improving the response of the vehicle according to the steering wheel turning speed ωs.

The IFS control calculation unit 35, the variable gear ratio calculation unit 36, and the LeadSteer control calculation unit 37 output the calculated control target elements, that is, the IFS_ACT command angle θifs**, the variable gear ratio ACT command angle θgr*, and the LS_ACT command angle θls* to an adder 38*a*. The adder 38*a* then superimposes the IFS_ACT command angle ifs**, the variable gear ratio ACT command angle θgr*, and the LS_ACT command angle θls* on one another, thereby calculating an ACT command angle θta*, which is a control target of the ACT angle θta.

The ACT command angle θta* calculated by the adder 38*a* is inputted to an FF control calculation unit 39 and an FB control calculation unit 40. The FB control calculation unit 40 receives the ACT θta detected by a rotation angle sensor 41 provided at the motor 12. The FF control calculation unit 39 executes feedforward calculation based on the inputted ACT command angle θta* to calculate a control amount εff. The FB control calculation unit 40 executes feedback calculation based on the ACT command angle θta* and the ACT angle θta to compute a control amount εfb.

The FF control calculation unit 39 and the FB control calculation unit 40 output the calculated control amount εff and control amount εfb to an adder 38b. The control amount εff and the control amount εfb are superimposed on each other at the adder 38b, and are inputted to a motor control signal output unit 42 as an electric current command. Based on the inputted current command, the motor control signal output unit 42 generates a motor control signal and outputs the signal to the drive circuit 34.

Figure 5:
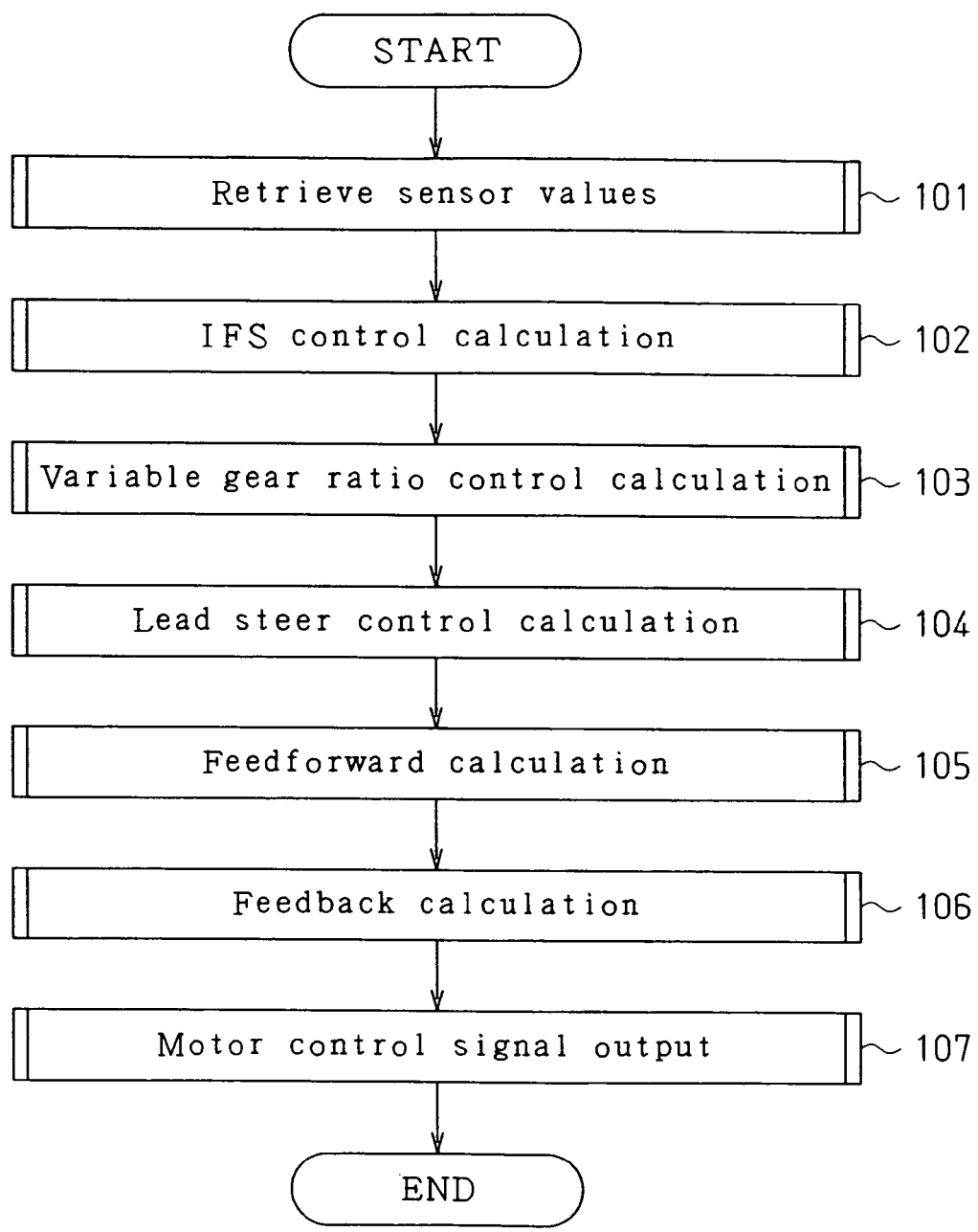
FIG. 5 is a flowchart showing a calculation executed by the ECU 8 shown in FIG. 4.

That is, as shown in the flowchart of FIG. 5, the microcomputer 33 retrieves the sensor values from the sensors as vehicle state quantities (step 101). Then, the microcomputer 33 executes IFS control calculation (step 102). Subsequently, the microcomputer 33 executes variable gear ratio control calculation (step 103) and LeadSteer control calculation (step 104). Then, the microcomputer 33 superimposes the IFS_ACT command angle θifs**, the variable gear ratio ACT command angle θgr*, and the LS_ACT command angle θls*, which are calculated by the calculations of steps 102 to 104, on each other, thereby computing the ACT command angle θta*, which is a control target.

Based on the calculated ACT command angle θta*, the microcomputer 33 executes feedforward calculation (step 105) and feedback calculation (step 106) to calculate an electric current command. Based on the electric current command, the microcomputer 33 outputs a motor control signal (step 107).

An IFS control calculation process at the IFS at the IFS control calculation unit 35 will now be described.

Figure 6:
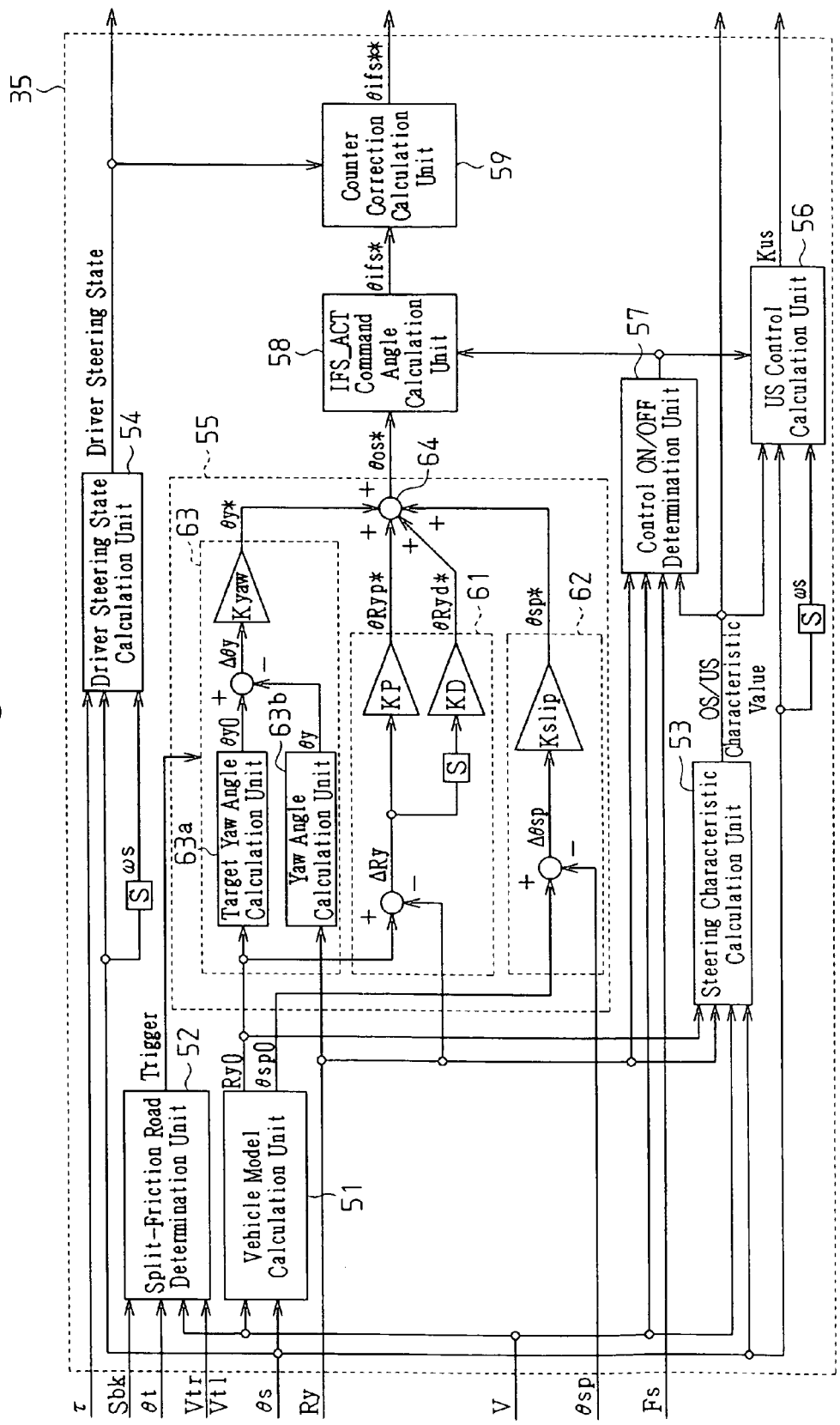
FIG. 6 is a control block diagram of the IFS control calculation unit 35 shown in FIG. 4.

FIG. 6 is a control block diagram showing the IFS control calculation unit 35. As shown in FIG. 6, the IFS control calculation unit 35 includes a vehicle model calculation unit 51, a split-friction road determination unit 52, a steering characteristic calculation unit 53, a driver steering state calculation unit 54, an OS control calculation unit 55, a US control calculation unit 56, a control ON/OFF determination unit 57, an IFS_ACT command angle calculation unit 58, and a counter correction calculation unit 59.

The vehicle model calculation unit 51 receives the steering wheel turning angle θs and the vehicle speed V. Based on the steering wheel turning angle θs and the vehicle speed V, the vehicle model calculation unit 51 executes model calculation to calculate a target yaw rate Ry0 and a target slip angle θsp0.

The computing method for calculating the target yaw rate Ry0 and the target slip angle θsp0 from the steering wheel turning angle θs and the vehicle speed V based on the vehicle model calculation in the vehicle model calculation unit 51 of the present embodiment, that is, based on the vehicle model, is disclosed, for example, in Japanese Laid-Open Patent Publication No. 2002-254962. The explanation of the method is therefor omitted.

The split-friction road determination unit 52 receives the wheel speeds Vtr, Vtl, the wheel angle θt, the vehicle speed V, and the brake signal Sbk. Based on these vehicle state quantities, the split-friction road determination unit 52 determines whether the vehicle is on a road surface with a split coefficient of friction, or whether the wheels on the left side and the wheels on the right side are on surfaces of significantly different coefficients of friction (split μ road surface). Specifically, the split-friction road determination unit 52 determines whether the vehicle is in a braking state in a split μ condition, that is, in a split μ braking condition (split-friction road determination).

The steering characteristic calculation unit 53 receives the steering wheel turning angle θs, the vehicle speed V, the yaw rate Ry, and the target yaw rate Ry0 calculated at the vehicle model calculation unit 51. Based on these vehicle state quantities, the steering characteristic calculation unit 53 computes the steering characteristic of the vehicle, that is, which one of oversteer, understeer, and neutral steer the vehicle is in. The steering characteristic calculation unit 53 calculates the OS/US characteristic value (steering characteristic value), which represents the computed steering characteristic (steering characteristic calculation). In the present embodiment, the OS/US characteristic value is outputted as a variable value that functions as an analog value, which continuously changes in accordance with the steering characteristic of the vehicle. When the sign of the OS/US characteristic value is positive, the OS/US characteristic value indicates OS characteristic. When the sign of the OS/US characteristic value is negative, the OS/US characteristic value indicates US characteristic.

The driver steering state calculation unit 54 receives the steering wheel turning angle θs and the steering wheel turning speed ωs. Based on the steering wheel turning angle θs and the steering wheel turning speed ωs, the driver steering state calculation unit 54 computes the steering state of the driver, that is, computes whether the steering operation of the driver is "further steering" for increasing the absolute amount of the steering wheel turning angle θs or "reverse steering" for reducing the absolute amount of the steering wheel turning angle θs (the driver steering state calculation).

The OS control calculation unit 55 includes a yaw rate FB calculation unit 61, a slip angle FB calculation unit 62, and a yaw angle FB calculation unit 63. These FB calculation units each execute feedback calculation such that a corresponding vehicle state quantity seeks a target value.

Specifically, the yaw rate FB calculation unit 61 receives the yaw rate Ry and the target yaw rate Ry0 calculated at the vehicle model calculation unit 51. The yaw rate FB calculation unit 61 executes feedback calculation based on a deviation ΔRy. Specifically, the yaw rate FB calculation unit 61 multiplies the deviation ΔRy by a proportionate FB gain KP to calculate a yaw rate proportionate FB command angle θRyp*. The yaw rate FB calculation unit 61 also multiplies a differentiation amount of the deviation ΔRy by a differentiation FB gain KD to compute a yaw rate differentiation FB command angle θRyd* (yaw rate FB calculation).

The slip angle FB calculation unit 62 receives the slip angle θsp and the target slip angle θsp0 calculated by the vehicle model calculation unit 51. The slip angle FB calculation unit 62 multiplies a deviation Δθsp by a slip angle FB gain Kslip, thereby calculating a slip angle FB command angle θsp* (slip angle FB calculation).

The yaw angle FB calculation unit 63 receives the target yaw rate Ry0 and the yaw rate Ry. The yaw angle FB calculation unit 63 includes a target yaw angle calculation unit 63a and a yaw angle calculation unit 63b. The target yaw angle calculation unit 63a integrates the received target yaw rate Ry0 to calculate a target yaw angle θy0. Likewise, the yaw angle calculation unit 63b integrates the inputted yaw rate Ry to calculate a yaw angle θy. The yaw angle FB calculation unit 63 multiplies a deviation Δθy by a yaw angle FB gain Kyaw, thereby calculating a yaw angle FB command angle θy* (yaw angle FB calculation).

In the present embodiment, the yaw angle FB calculation unit 63 receives a determination result at the split-friction road determination unit 52 as a trigger. When the split-friction road determination unit 52 determines that the vehicle is no in a split μ braking state, the yaw angle FB calculation unit 63 does not execute the yaw angle FB calculation.

The above described control target elements related to the vehicle state quantities calculated at the yaw rate FB calculation unit 61, the slip angle FB calculation unit 62, and the yaw angle FB calculation unit 63, that is, the yaw rate proportionate FB command angle θRyp*, the yaw rate differentiation FB command angle θRyd*, the slip angle FB command angle θsp*, and the yaw angle FB command angle θy* are inputted to the adder 64. The OS control calculation unit 55 superimposes these control target elements on one another at the adder 64 to calculate an OS control ACT command angle θos* as the control target element of the ACT angle θta when the steering characteristic is oversteer, that is, a control target element that adds a steering angle in the reverse direction (counter steer) to the direction of the yaw moment to the steered wheels 6 (OS control calculation).

The US control calculation unit 56 receives the steering wheel turning angle θs and the steering wheel turning speed ωs, and the OS/US characteristic value calculated at the steering characteristic calculation unit 53. Based on these vehicle state quantities, the US control calculation unit 56 calculates the US control variable gear ratio gain Kus (US control calculation).

The US control calculation unit 56 receives a control ON/OFF signal, which is a determination result of the control ON/OFF determination (described below) executed by the control ON/OFF determination unit 57. When the control ON/OFF signal indicates "US control ON", the US control calculation unit 56 sends the US control variable gear ratio gain Kus, which has been calculated by the US control calculation, to the variable gear ratio calculation unit 36. If the control ON/OFF signal from the control ON/OFF determination unit 57 does not indicate "US control ON", the US control calculation unit 56 sets the US control variable gear ratio gain Kus to 1, and outputs the gain Kus to the variable gear ratio calculation unit 36.

In the present embodiment, the control ON/OFF determination unit 57 receives the vehicle speed V, the yaw rate Ry, the lateral acceleration Fs, and the OS/US characteristic value calculated by the steering characteristic calculation unit 53. Based on these vehicle state quantities, the control ON/OFF determination unit 57 determines whether to execute the oversteer control (OS control) based on the OS control ACT command angle θos* calculated by the OS control calculation unit 55, or the understeer control (US control) based on the US control variable gear ratio gain Kus calculated by the US control calculation unit 56 (the control ON/OFF determination).

The control ON/OFF determination unit 57 sends determination result of the control ON/OFF determination, or a control ON/OFF signal, to the US control calculation unit 56 and the IFS_ACT command angle calculation unit 58. The control ON/OFF signal is one of "OS control ON" for executing the OS control, "US control ON" for executing the US control, and "control OFF" for executing neither of the controls.

The IFS_ACT command angle calculation unit 58 receives the control ON/OFF signal and OS control ACT command angle θos* calculated by the OS control calculation unit 55. The IFS_ACT command angle calculation unit 58 computes an IFS_ACT command angle θifs* based on the OS control ACT command angle θos* and the control ON/OFF signal (IFS_ACT command angle calculation).

Specifically, when the inputted control ON/OFF signal is "OS control ON", the IFS_ACT command angle calculation unit 58 sets the OS control ACT command angle θos* as the IFS_ACT command angle θifs*. When the control ON/OFF signal is not "OS control ON", the IFS_ACT command angle calculation unit 58 sets 0 as the IFS_ACT command angle θifs*.

The counter correction calculation unit 59 receives the IFS_ACT command angle θifs* and the driver steering state computed by the driver steering state calculation unit 54. Based on the inputted driver steering state, the counter correction calculation unit 59 executes calculation for correcting the IFS_ACT command angle θifs*, and outputs the corrected IFS_ACT command angle θifs** (counter correction calculation). In the present embodiment, the driver steering state is inputted to the counter correction calculation unit 59 as a counter correction gain. The counter correction calculation unit 59 multiplies the IFS_ACT command angle θifs* by the counter correction gain for computing the IFS_ACT command angle θifs** in the counter correction calculation.

The IFS control calculation unit 35 executes the IFS control calculation by executing calculation processes (determination processes) by the calculation units (determination units) in the following manner.

Figure 7:
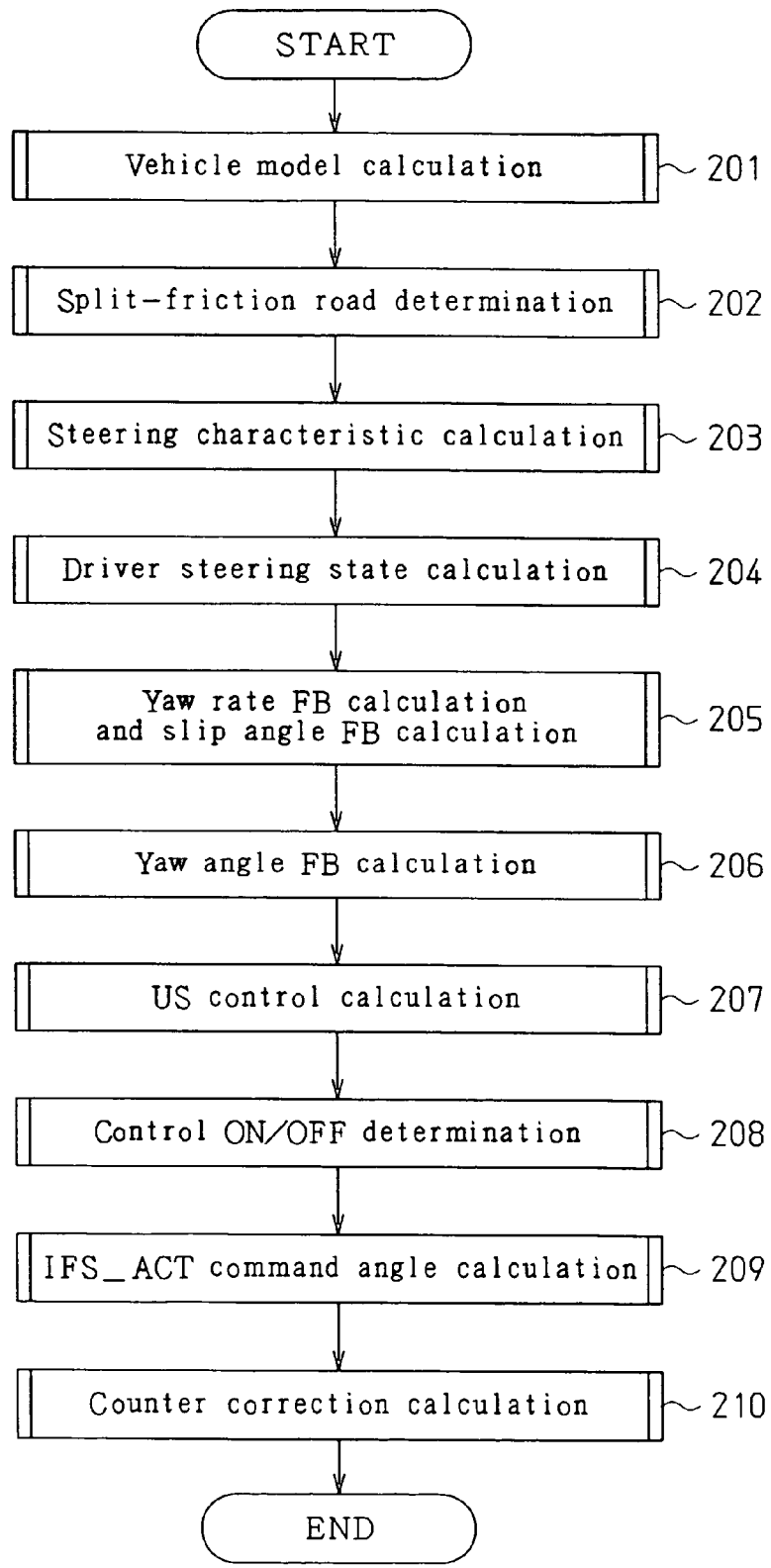
FIG. 7 is a flowchart showing an IFS control calculation executed by the IFS control calculation unit 35 shown in FIG. 6.

That is, as shown in the flowchart of FIG. 7, the IFS control calculation unit 35 first executes the vehicle model calculation (step 201), and then executes the split-friction road determination (step 202). The IFS control calculation unit 35 then executes the steering characteristic calculation (step 203), and subsequently executes a driver steering state calculation (step 204).

Next, based on the target yaw rate Ry0 and the target slip angle θsp0 calculated in the vehicle model calculation at step 201, the IFS control calculation unit 35 executes the yaw rate FB calculation and the slip angle FB calculation (step 205). Using the determination result in the split-friction road determination at step 202 as a trigger, the IFS control calculation unit 35 executes the yaw angle FB calculation (step 206).

Through the FB calculation at each of steps 205 and 206, the IFS control calculation unit 35 calculates control target elements corresponding to each of the vehicle state quantities, and superimposes these control target elements for calculating the OS control ACT command angle θos* as a control target element of the ACT angle θta, which is a base for the OS control.

Subsequently, the IFS control calculation unit 35 executes the US control calculation (step 207), and the control ON/OFF determination (step 208). Then, based on the determination result at step 208, the IFS control calculation unit 35 outputs the US control variable gear ratio gain Kus for the US control, or executes an IFS_ACT command angle calculation for calculating the IFS_ACT command angle θifs*, which is a control target element of the ACT angle θta for the OS control (step 209). When having executed step 209, the IFS control calculation unit 35 executes a counter correction calculation based on the driver steering state computed at step 204, and outputs the corrected IFS_ACT command angle θifs** (step 210).

The understeer control (US control) of the steering apparatus according to the present invention will now be described.

Figure 8:
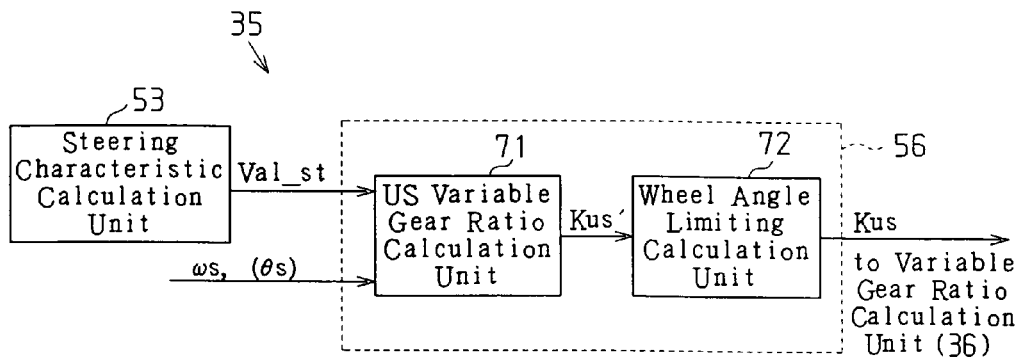
FIG. 8 is a control block diagram related to understeer control executed by the steering characteristic calculation unit 53 and the US control calculation unit 56 shown in FIG. 6.
Figure 9:
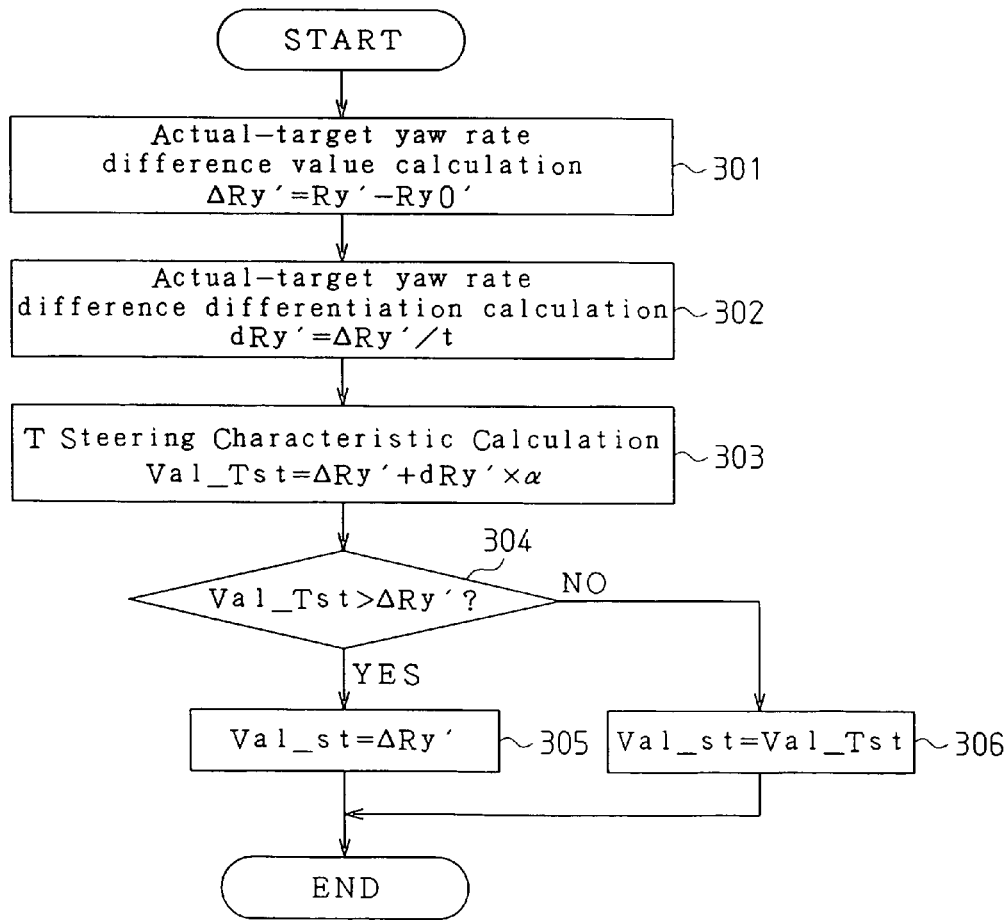
FIG. 9 is a flowchart showing a steering characteristic calculation executed by the steering characteristic calculation unit 53 shown in FIG. 8.

FIG. 8 is a control block diagram showing the IFS control calculation unit 35 related to the US control. FIG. 9 is a flowchart of the steering characteristic calculation in the steering characteristic calculation unit 53.

As shown in FIG. 8, the steering characteristic calculation unit 53, which functions as a calculation unit and correction unit, computes a variable value that functions as an analog value, which continuously varies in accordance with the vehicle steering characteristic based on the inputted vehicle state quantities. The steering characteristic calculation unit 53 sends the analog value to the US control calculation unit 56 as an OS/US characteristic value Val_st.

Specifically, the steering characteristic calculation unit 53 computes a difference value ΔRy' between the detected actual yaw rate Ry' (Ry'=Ry) and a target yaw rate Ry0' (Ry0'=Ry0) calculated by the vehicle model calculation unit 51, and outputs the difference value ΔRy' to the US control calculation unit 56 as an OS/US characteristic value Val_st. When the inputted OS/US characteristic value Val_st is in a range indicating the US characteristic, the US control calculation unit 56 computes a greater value of the US control variable gear ratio gain Kus as the OS/US characteristic value Val_st indicates a stronger (more remarkable) US characteristic greater value. That is, the US control calculation unit 56 computes the US control variable gear ratio gain Kus such that the actual steering angle (wheel angle θt) of the steered wheels 6 is reduced (decelerated) in relation to the steering wheel turning angle θs, and outputs the US control variable gear ratio gain Kus to the variable gear ratio calculation unit 36.

In the present embodiment, the steering characteristic calculation unit 53 subtracts the target yaw rate Ry0' from the actual yaw rate Ry', for computing the difference value ΔRy' (ΔRy'=Ry'−Ry0'). Therefore, if the actual yaw rate Ry' is greater than the target yaw rate Ry0', that is, if the OS characteristic is present, the OS/US characteristic value Val_st has a positive value, and the stronger the tendency of the OS characteristic, the greater the OS/US characteristic value Val_st becomes. If the target yaw rate Ry0' is greater than the actual yaw rate Ry', that is, if the target yaw rate Ry0' has a US characteristic, the OS/US characteristic value Val_st has a negative value, and the stronger the tendency of the US characteristic, the greater the OS/US characteristic value Val_st becomes. When the inputted OS/US characteristic value Val_st has a negative value, the greater the inputted OS/US characteristic value Val_st, the greater the US control variable gear ratio gain Kus outputted to the variable gear ratio calculation unit 36 by the US control calculation unit 56 becomes. That is, when the difference value ΔRy', which is a variable value, indicates that the steering characteristic is understeer, the steering characteristic calculation unit 53 controls the variable gear ratio actuator 7 to change the second steering angle (the ACT angle θta) such that the greater the understeer indicated by the difference value ΔRy', the smaller the steering angle of steered wheels 6 (the wheel angle θt) relative to the turning angle θs of the steering wheel 2 becomes.

A great negative value refers to a value that has a negative sign and a great absolute value. That is, the stronger the US characteristic, the less the OS/US characteristic value Val_st becomes (a greater negative value).

Also, in the present embodiment, the steering characteristic calculation unit 53 computes the difference value ΔRy' and a differentiated difference value dRy', which is obtained by differentiating the difference value ΔRy' (with respect to time t). When the differentiated difference value dRy' is in a range where the US characteristic is increased (more remarkable), the steering characteristic calculation unit 53 corrects the OS/US characteristic value Val_st, such that the stronger the tendency indicated by the differentiated difference value dRy', the more increased the US characteristic indicated by the OS/US characteristic value Val_st. That is, when the differentiated difference value dRy' indicates that understeer is increasing, the steering characteristic calculation unit 53 controls the OS/US characteristic value Val_st such that the greater the degree of change of understeer indicated by the differentiated difference value dRy', the greater the understeer indicated by the OS/US characteristic value Val_st becomes.

When there is a tendency that the US characteristic increases, the differentiated difference value dRy' has a negative value, and the stronger the tendency, the greater the differentiated difference value dRy' becomes. When there is a tendency that the US characteristic decreases, the differentiated difference value dRy' has a positive value, and the stronger the tendency, the greater the differentiated difference value dRy' becomes. Therefore, as the differentiated difference value dRy' has a greater negative value, the steering characteristic calculation unit 53 corrects the OS/US characteristic value Val_st (difference value ΔRy') to have a greater negative value based on the differentiated difference value dRy', and outputs the corrected value to the US control calculation unit 56.

Specifically, as shown in FIG. 9, the steering characteristic calculation unit 53 first executes difference value calculation between the actual yaw rate and the target yaw rate, or actual-target yaw rate difference value calculation (step 301), differentiation calculation of the actual-target yaw rate difference value (step 302), thereby computing the difference value ΔRy' and the differentiated difference value dRy'.

Next, the steering characteristic calculation unit 53 multiplies the differentiated difference value dRy' by a factor α, and adds the resultant to the difference value ΔRy', thereby computing a T steering characteristic value (temporary steering characteristic value) Val_Tst (T steering characteristic calculation, step 303). The predetermined factor α is a factor for changing the degree by which the differentiated difference value dRy' is reflected on the US control in accordance with the behavioral characteristics (characteristics related to changeability of the steering characteristic), which are different between the types of vehicles.

Next, the steering characteristic calculation unit 53 determines whether the T steering characteristic value Val_Tst is greater than the difference value ΔRy' (Val_Tst>ΔRy') at step 304. When the T steering characteristic value Val_Tst is greater than the difference value ΔRy' (step 304: YES), the steering characteristic calculation unit 53 outputs the difference value ΔRy' to the US control calculation unit 56 as the OS/US characteristic value Val_st (step 305). When the T steering characteristic value Val_Tst is less than the difference value ΔRy' (step 304: NO), the steering characteristic calculation unit 53 sends the T steering characteristic value Val_Tst to the US control calculation unit 56 as the OS/US characteristic value Val_st (step 306).

The T steering characteristic value Val_Tst is less than the difference value ΔRy' when the differentiated difference value dRy' has a negative value. Therefore, when the differentiated difference value dRy' has a negative value, the T steering characteristic value Val_Tst is outputted to the US control calculation unit 56 as the OS/US characteristic value Val_st. When the vehicle has US characteristic, the difference value ΔRy' has a negative sign. Therefore, the greater negative value (the greater absolute value) the differentiated difference value dRy' becomes, the greater negative value the T steering characteristic value Val_Tst becomes.

Figure 10:
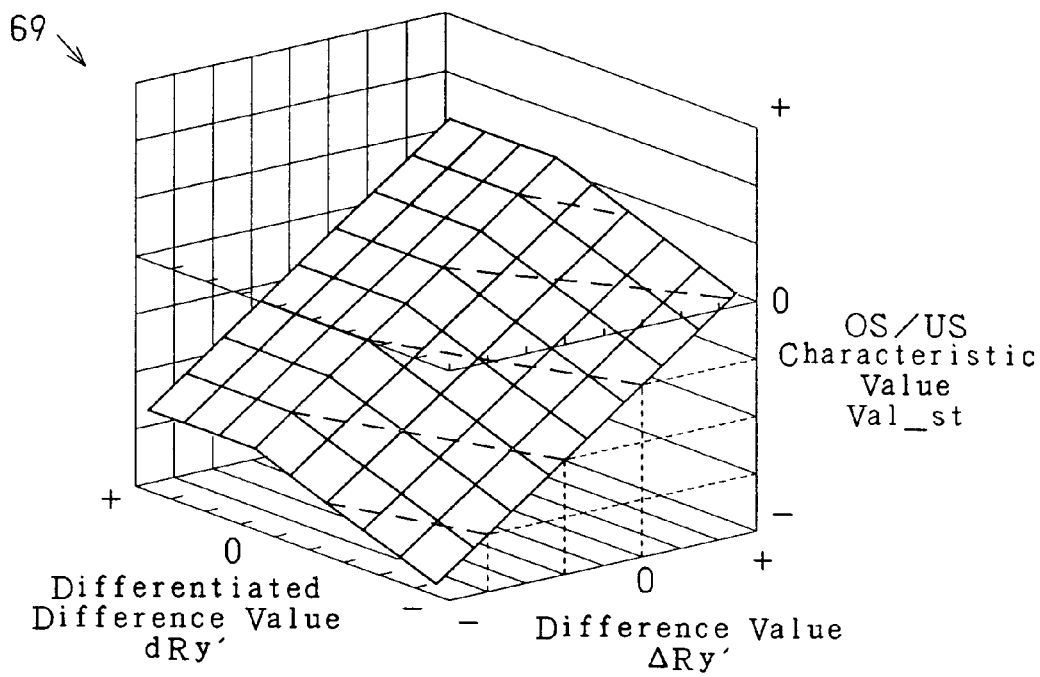
FIG. 10 is a diagram showing the waveform of an OS/US characteristic value Val_st computed in the process of FIG. 9.

That is, as shown in the output waveform diagram (map 69) of FIG. 10, when the differentiated difference value dRy' has a negative sign, a value proportionate to the differentiated difference value dRy' is added to the difference value ΔRy', and the resultant is set as the T steering characteristic value Val_Tst. The T steering characteristic value Val_Tst is outputted as the OS/US characteristic value Val_st, so that the OS/US characteristic value Val_st is corrected to be a greater negative value when the US characteristic has a tendency to increase. That is, the steering characteristic calculation unit 53 corrects the OS/US characteristic value Val_st to be a value that indicates an increased US characteristic.

Based on the OS/US characteristic value Val_st, the US control calculation unit 56 outputs a greater US control variable gear ratio gain Kus to the variable gear ratio calculation unit 36, so that variable gear ratio ACT command angle θgr*, which is a control element of the ACT angle θta related to the US control, is increased (see FIG. 4). Accordingly, the responsiveness of the US control is improved.

Also, in the present embodiment, the US control calculation unit 56 calculates a greater value of the US control variable gear ratio gain Kus as the OS/US characteristic value Val_st has a greater negative value (absolute value), and changes the US control variable gear ratio gain Kus based on the direction of the driver's steering operation and the steering wheel turning speed ωs. Specifically, when the steering operation direction is "further steering", which increases the US characteristic, the US control calculation unit 56 computes a greater value of the US control variable gear ratio gain Kus as the steering wheel turning speed ωs becomes faster. When the steering operation direction is "reverse steering", which decreases the US characteristic, the US control calculation unit 56 computes a smaller value of the US control variable gear ratio gain Kus as the steering wheel turning speed ωs becomes faster.

Figure 11:
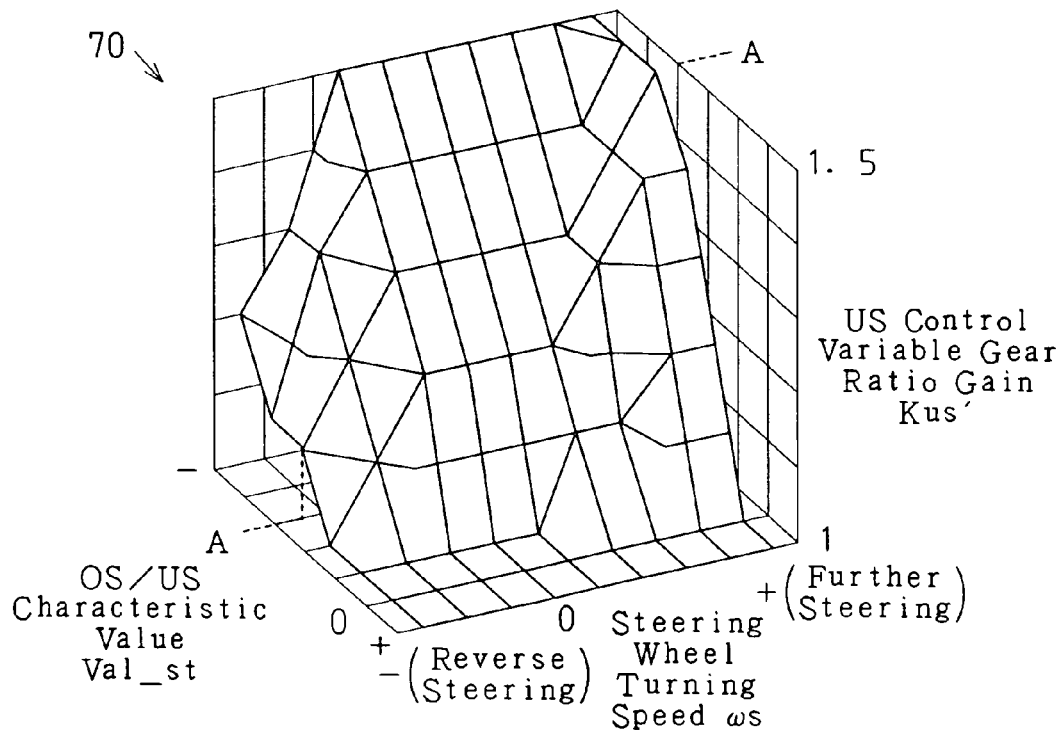
FIG. 11 is a diagram showing a three-dimensional map stored in the US variable gear ratio calculation unit 71 shown in FIG. 8.

Specifically, as shown in FIG. 8, the US control calculation unit 56 includes a US variable gear ratio calculation unit 71. The US variable gear ratio calculation unit 71 has a three-dimensional map 70, in which the OS/US characteristic value Val_st and the steering wheel turning speed ωs (and the steering operation direction) are correlated with the US control variable gear ratio gain Kus' (see FIG. 11).

Figure 12:
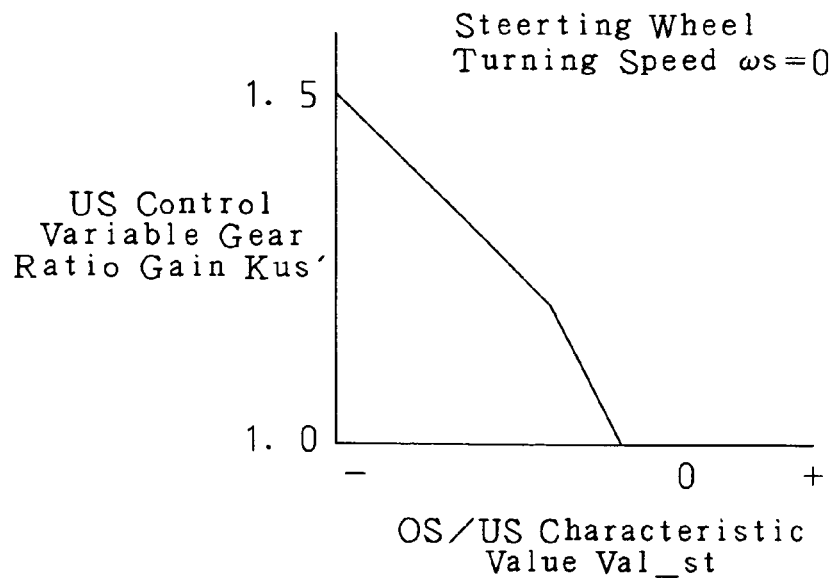
FIG. 12 is a graph showing the characteristics related to the OS/US characteristic value Val_st shown in the three-dimensional map of FIG. 11.

In the present embodiment, the three-dimensional map 70 is configured such that when the OS/US characteristic value Val_st has a negative value, the greater the absolute value of the OS/US characteristic value Val_st, the greater the corresponding US control variable gear ratio gain Kus' becomes (see FIG. 12, for example, a case where the steering wheel turning speed ωs is 0). Also, three-dimensional map 70 is configured such that when the steering operation direction is "further steering", the faster the steering wheel turning speed ωs, the greater the US control variable gear ratio gain Kus' becomes. Further, the three-dimensional map 70 is configured such that when the steering operation direction is "reverse steering", the faster the steering wheel turning speed ωs, (the greater the absolute value of ωs), the smaller the corresponding US control variable gear ratio gain Kus' becomes (see FIG. 13, for example, a case where the OS/US characteristic value Val_st is A). In the present embodiment, when the steering operation direction is "further steering", the sign of the steering wheel turning speed ωs is "+", and when the steering operation direction is "reverse steering", the sign of the steering wheel turning speed ωs is "−".

As described above, the US variable gear ratio calculation unit 71 computes the OS/US characteristic value Val_st and the US control variable gear ratio gain Kus' that corresponds to the steering wheel turning speed ωs based on the three-dimensional map 70, so that when the OS/US characteristic value Val_st has a negative value, the greater the absolute value of the OS/US characteristic value Val_st, the greater the computed US control variable gear ratio gain Kus' becomes. Also, the US variable gear ratio calculation unit 71 changes the US control variable gear ratio gain Kus' according to the steering operation direction and the steering wheel turning speed ωs.

Specifically, when the steering operation direction is "further steering", which increases the US characteristic, the US variable gear ratio calculation unit 71 calculates a greater value of the US control variable gear ratio gain Kus as the steering wheel rotation speed ωs becomes faster. When the steering operation direction is "reverse steering", the US variable gear ratio calculation unit 71 calculates a smaller value (greater negative value) of the US control variable gear ratio gain Kus' as the steering wheel turning speed ωs becomes faster.

In this manner, when the steering operation increases the US characteristic, the steering characteristic calculation unit 53 and the US control calculation unit 56 increase the variable gear ratio ACT command angle θgr*, which is a control element of the ACT angle θta related to the US control, as the tendency that increases US characteristic is stronger, thereby improving the responsiveness of the US control. Also, when the steering operation decreases the US characteristic, the steering characteristic calculation unit 53 and the US control calculation unit 56 reduce the variable gear ratio ACT command angle θgr* as the tendency that decreases the US characteristic becomes stronger, thereby preventing the gear ratio from being excessively high, or preventing the steering ratio from being excessively slow.

In the present embodiment, the US control calculation unit 56 includes a wheel angle limiting calculation unit 72 that executes a correction calculation for preventing the steering shaft unit 3 from being excessively rotated due to an excessive increase in the US control variable gear ratio gain Kus'. The US control variable gear ratio gain Kus' calculated by US variable gear ratio calculation unit 71 is inputted to the wheel angle limiting calculation unit 72. After being corrected by the wheel angle limiting calculation unit 72, the US control variable gear ratio gain Kus is outputted to the variable gear ratio calculation unit 36.

The above described embodiment provides the following advantages.

(1) The T steering characteristic value Val_Tst is calculated by adding a value proportionate to the differentiated difference value dRy' of the difference value ΔRy' to the difference value ΔRy' between the actual yaw rate Ry' and the target yaw rate Ry0'. The steering characteristic calculation unit 53 determines whether the T steering characteristic value Val_Tst is greater than the difference value ΔRy' (that is, whether the differentiated difference value dRy' is in a range where there is a tendency that the US characteristic increases) at step 304. When the T steering characteristic value Val_Tst is greater than the difference value ΔRy' (step 304: YES), the steering characteristic calculation unit 53 sets the difference value ΔRy' as the OS/US characteristic value Val_st (step 305). When the T steering characteristic value Val_Tst is less than the difference value ΔRy' (step 304: NO), the steering characteristic calculation unit 53 sets the T steering characteristic value Val_Tst as the OS/US characteristic value Val_st (step 306).

According to this configuration, when the T steering characteristic value Val_Tst is less than the difference value ΔRy', that is, when there is a tendency that the US characteristic increases (a case where the differentiated difference value dRy' has a negative value), the T steering characteristic value Val_Tst is sent to the US control calculation unit 56 as the OS/US characteristic value Val_st. That is, when there is a tendency that the US characteristic increases, the OS/US characteristic value Val_st is corrected to a greater negative value (greater absolute value), that is, a value that indicates a more increased US characteristic as the tendency that the US characteristic increases. Based on the corrected OS/US characteristic value Val_st, a greater value of the US control variable gear ratio gain Kus is outputted to the variable gear ratio calculation unit 36. That is, the steering characteristic calculation unit 53 and the US control calculation unit 56 capture a tendency that the US characteristic increases at an early stage, thereby quickly increases the variable gear ratio ACT command angle θgr*, which is a control element of the ACT angle θta related to US control. As a result, the responsiveness of the understeer control is improved without estimating the degree of grip of the steered wheels 6. Therefore, the steering apparatus 1 does not need to have a torque sensor for detecting steering torque required for estimating the degree of grip of the steered wheels 6. This configuration simplifies the configuration and reduces the costs. Thus, the present invention may be applied to a hydraulic power steering unit that has no torque sensor.

Figure 13:
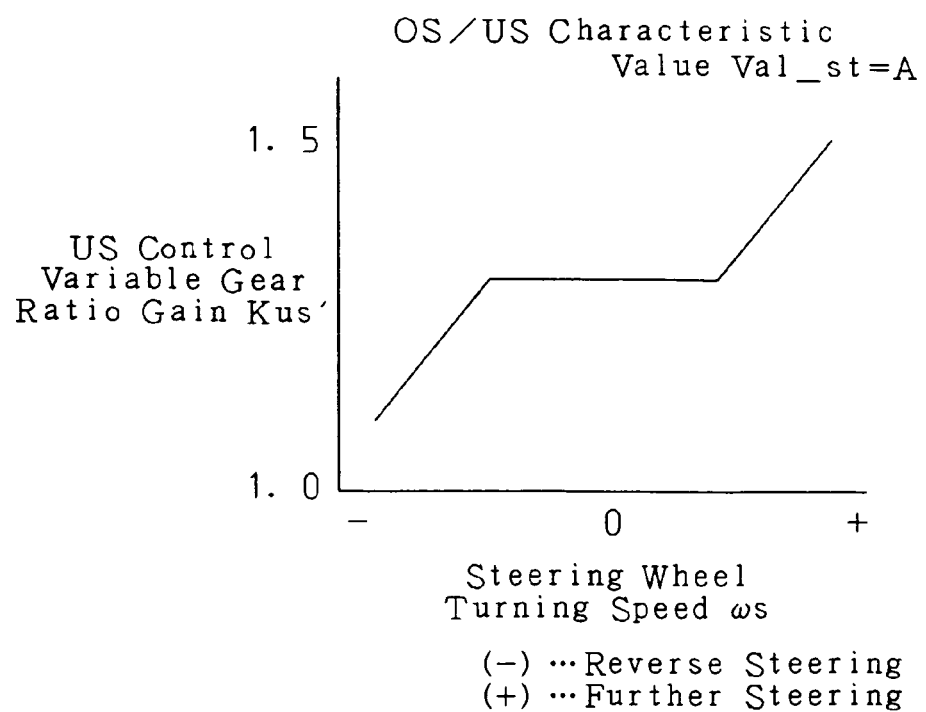
FIG. 13 is a graph showing the characteristics related to the steering wheel turning speed ωs shown in the three-dimensional map of FIG. 11.

(2) Based on the steering operation direction of the driver and the steering wheel turning speed ωs, the US control calculation unit 56 changes the US control variable gear ratio gain Kus (see FIG. 13). This configuration permits a tendency of change in the US characteristic due to the steering operation of the driver to be captured at an early stage. The tendency can be reflected on the US control variable gear ratio gain Kus, and on the variable gear ratio ACT command angle θgr*, which is a control element of the ACT angle θta related to the US control. As a result, the responsiveness of the understeer control is improved.

(3) When the steering operation direction is "further steering" (the sign of ωs is +), the US control calculation unit 56 calculates a greater value of the US control variable gear ratio gain Kus as the steering wheel turning speed ωs becomes faster (see FIG. 13). According to this configuration, when the steering operation increases the US characteristic, the stronger the tendency that the US characteristic increases, the greater the US control variable gear ratio gain Kus becomes, so that the variable gear ratio ACT command angle θgr*, which is a control element of the ACT angle θta related to the US control, is quickly increased. As a result, the responsiveness of the understeer control is improved.

(4) When the steering operation direction is "reverse steering" (the sign of ωs is −), the US control calculation unit 56 calculates a smaller value of the US control variable gear ratio gain Kus as the steering wheel turning speed ωs becomes faster (see FIG. 13). According to this configuration, when the steering operation decreases the US characteristic, the stronger the tendency that US characteristic decreases, the less the US control variable gear ratio gain Kus becomes, so that the variable gear ratio ACT command angle θgr*, which is a control element of the ACT angle θta related to the US control, is quickly decreased. As a result, the gear ratio is prevented from being excessively high, that is, the steering ratio does not become excessively slow. This improves the steering feel.

(5) The US control calculation unit 56 has the US variable gear ratio calculation unit 71 having the three-dimensional map 70, in which the OS/US characteristic value Val_st and the steering wheel turning speed ωs (and the steering operation direction) are correlated with the US control variable gear ratio gain Kus'. Based on the three-dimensional map 70, the US variable gear ratio calculation unit 71 calculates the US control variable gear ratio gain Kus' that corresponds to the OS/US characteristic value Val_st and the steering wheel turning speed ωs. According to this configuration, the responsiveness of the understeer control is improved by a simple structure.

The invention may be embodied in the following forms.

In the above described embodiment, as the analog value that functions as a variable value, which changes continuously in accordance with the vehicle steering characteristic, the difference value ΔRy' between the detected actual yaw rate Ry' and target yaw rate Ry0' is used. However, the variable value that functions as the analog value may be the difference value between the actual slip angle and a target slip angle, or the difference value between the front wheel slip angle and the rear wheel slip angle. Instead of these configurations, in which the difference values are used as the analog value without being changed, a value based on these difference values, for example, a value obtained by multiplying a difference value by a predetermined factor, may be used as the analog value.

In the above described embodiment, the difference value ΔRy' is calculated by subtracting the target yaw rate Ry0' from the actual yaw rate Ry' (Ry'−Ry0'). When the sign of the difference value ΔRy' is negative, the difference value ΔRy' is determined to be in a range indicating the US characteristic. However, the difference value ΔRy' may be calculated by subtracting the actual yaw rate Ry' from the target yaw rate Ry0' (Ry0'−Ry'). In this case, the sign of the difference value ΔRy' is positive, the difference value ΔRy' is determined to be in the range indicating the US characteristic. Also, the comparison determination in the above described embodiment is changed. Specifically, the direction of the inequality sign at step 304 is reversed.

Regarding the steering operation direction, it may be configured that the sign of the steering wheel turning speed ωs is "−" when the steering operation direction is "further steering", and the sign of the steering wheel turning speed ωs is "+" when the steering operation direction is "reverse steering".

In the above described embodiment, the steering characteristic calculation unit 53 determines whether the T steering characteristic value Val_Tst is greater than the difference value ΔRy' (step 304), thereby determining whether the differentiated difference value dRy' is in a range that indicates a tendency that the US characteristic increases. However, the steering characteristic calculation unit 53 may directly determine the sign of the differentiated difference value dRy', thereby determining whether the OS/US characteristic value Val_st should be corrected.

In the above described embodiment, the steering characteristic calculation unit 53 functions as a calculation unit for computing the analog value, and a correction unit that corrects the analog value. However, the calculation unit and the correction unit may be separately provided.

In the above described embodiment, the US control calculation unit 56 of the IFS control calculation unit 35 (see FIG. 6) outputs the US control variable gear ratio gain Kus to the variable gear ratio calculation unit 36, and the variable gear ratio calculation unit 36 (see FIG. 4) computes the variable gear ratio ACT command angle θgr* for the US control based on the US control variable gear ratio gain Kus. The variable gear ratio ACT command angle θgr* is superimposed on the other control target elements (θls*, θifs**) related to the ACT angle θta, so that the US control is executed (see FIG. 4).

Figure 14:
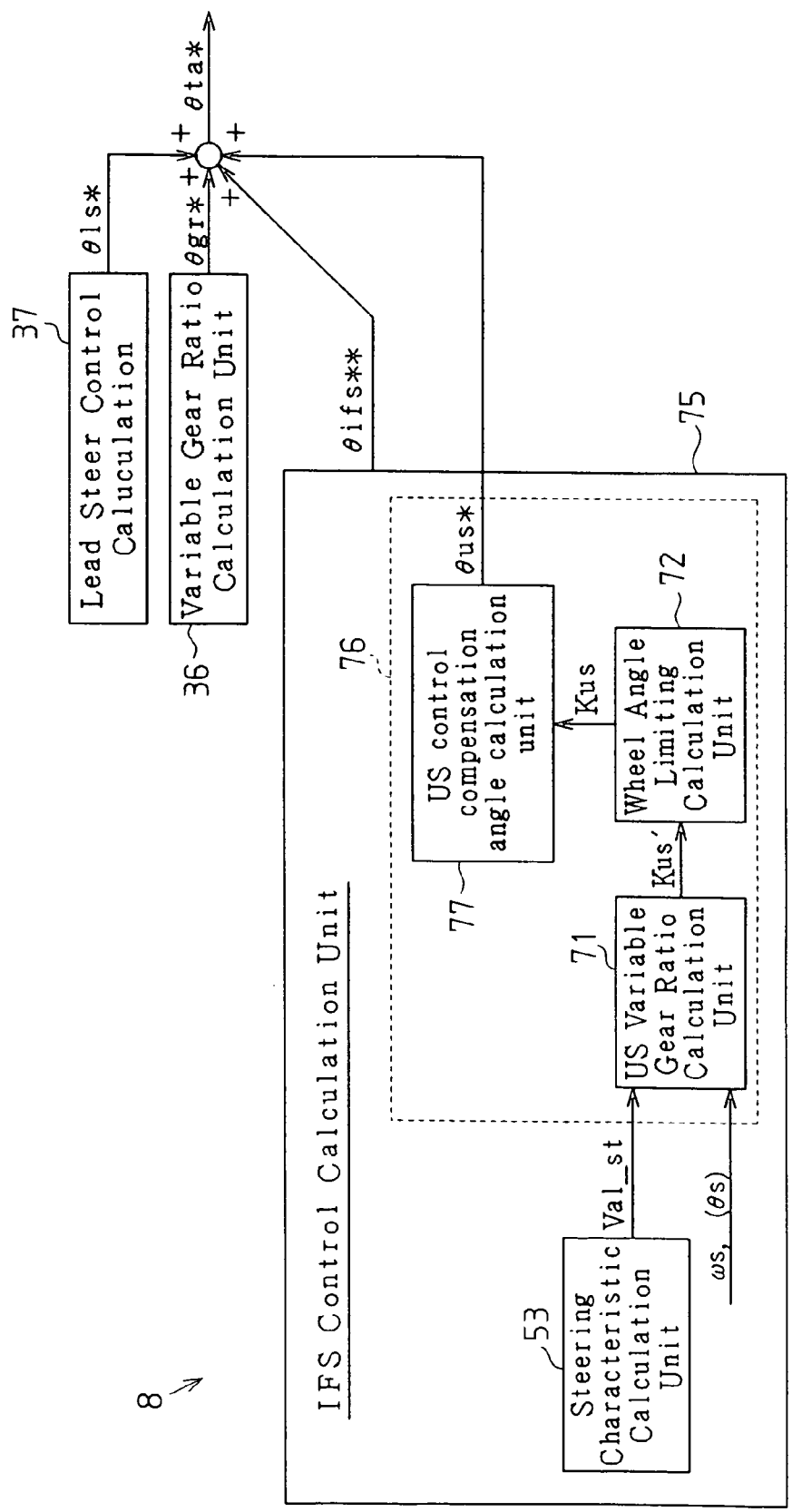
FIG. 14 is a control block diagram showing an IFS control calculation unit 75 according to a modified embodiment of the present invention.

However, like an IFS control calculation unit 75 shown in FIG. 14, a US control calculation unit 76 may be provided with a US control compensation angle calculation unit 77, and based on the US control variable gear ratio gain Kus from the wheel angle limiting calculation unit 72, the US control compensation angle calculation unit 77 may compute the US compensation command angle θus*, which is control element for the US control. The US compensation command angle θs* is superimposed on the other control elements (θls*, θgr*, θifs**) to execute the US control.

Figure 15A:
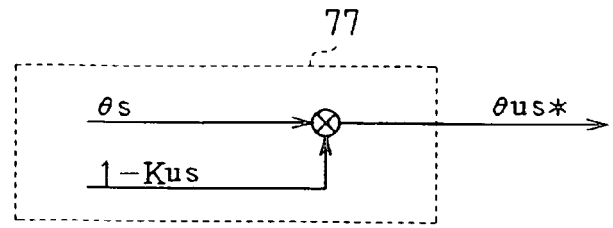
FIGS. 15(a), 15(b), and 15(c) are each control block diagram showing the US control compensation angle calculation unit 77 shown in FIG. 14.

The US compensation command angle θus* is calculated by subtracting the US control variable gear ratio gain Kus from 1, and multiplying the resultant (1−Kus) by the steering wheel turning angle θs as shown in FIG. 15(a). The value (1−Kus) is used because the US control is basically designed to reduce the wheel angle θt.

Figure 15B:
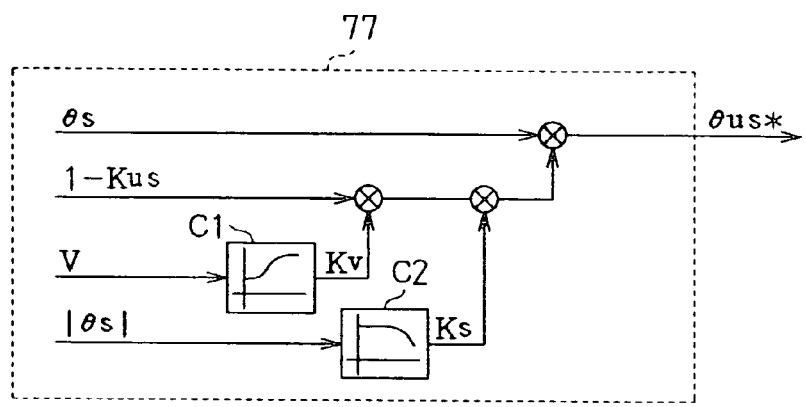

Further a configuration shown in FIG. 15(b) may be used. In this configuration, vehicle speed gain map calculation C1 based on the vehicle speed V and steering wheel turning angle gain map calculation C2 based on the absolute value (|θs|) of the steering wheel turning angle θs are first executed to compute a vehicle speed gain Kv and a steering wheel turning angle gain Ks. Then, a value obtained by subtracting the US control variable gear ratio gain Kus from 1 (1−Kus) is consecutively multiplied by the vehicle speed gain Kv and the steering wheel turning angle gain Ks. The resultant is multiplied by the steering wheel turning angle θs to compute the US compensation command angle θus*. This configuration permits the US control to be accurately executed based on the vehicle speed V and the steering wheel turning angle θs.

Figure 15C:
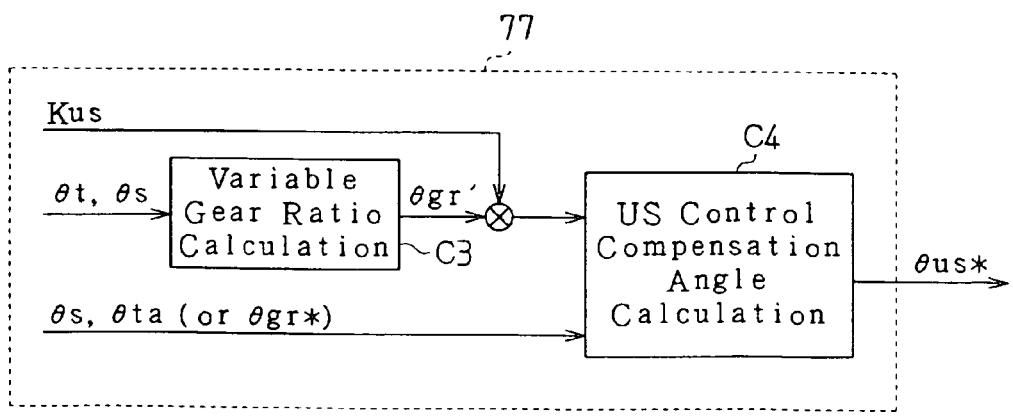

Also, a configuration shown in FIG. 15(c) may be used. In this configuration, the US control compensation angle calculation unit 77 executes variable gear ratio calculation C3 based on the wheel angle θt and the steering wheel turning angle θs (and a base gear ratio) to compute a variable gear ratio control amount θgr'. The computed variable gear ratio control amount θgr' is multiplied by the US control variable gear ratio gain Kus. Based on the resultant, the steering wheel turning angle θs, and the angle θta (or the variable gear ratio ACT command angle θgr*), US control compensation angle calculation C4 is executed to calculate the US compensation command angle θus*, which is used solely for the US control. This configuration further improves the accuracy of the US control.

Instead of computing the US compensation command angle θus* based on the US control variable gear ratio gain Kus, the US compensation command angle θus* may be directly computed, for example, by map calculation. Specifically, like the three-dimensional map 70 in the above described embodiment, a three-dimensional map may be used in which the OS/US characteristic value Val_st, and the steering wheel turning speed ωs (and the steering operation direction) are correlated with the US compensation command angle θus*.

In the above described embodiment, the present invention is applied to a hydraulic power steering system. However, the present invention may be applied to an electric power steering system (EPS).

Therefore, the present examples and embodiments are to be considered as illustrative and not restrictive and the invention is not to be limited to the details given herein, but may be modified within the scope and equivalence of the appended claims.

The invention claimed is:

1. A vehicle steering apparatus for changing a steering angle of steered wheels according to turning of a steering wheel, the apparatus comprising:
   a variable transmission ratio device having a motor for steering the steered wheels, wherein the steering angle of the steered wheels is determined by superimposing a first steering angle based on a turning angle of the steering wheel and a second steering angle based on the activation of the motor on each other, and wherein the variable transmission ratio device adjusts the second steering angle, thereby changing the ratio of the steering angle of the steered wheels to the turning angle of the steering wheel;
   a calculation unit for calculating a variable value that continuously changes in accordance with a steering characteristic of the vehicle, based on any one of a difference value between an actual yaw rate and a target yaw rate, a difference value between an actual slip angle and a target slip angle, and a difference value between a front wheel slip angle and a rear wheel slip angle;
   a control unit, wherein, when the variable value indicates that the steering characteristic is understeer, the control unit controls the variable transmission ratio device to change the second steering angle such that the greater the understeer indicated by the variable value, the smaller the steering angle of the steered wheels relative to the turning angle of the steering wheel becomes; and
   a correction unit, wherein, when the differentiated value of the variable value indicates that the understeer is changing to increase, the correction unit corrects the variable value such that the greater the degree of change of the understeer indicated by the differentiated value, the greater the understeer indicated by the variable value becomes.

2. The steering apparatus according to claim 1, wherein the control unit adjusts an amount of change of the second steering angle based on a direction of steering operation and a turning speed of the steering wheel.

3. The steering apparatus according to claim 2, wherein, when the steering operation direction is a direction that increases the understeer, the control unit increases the amount of change of the second steering angle as the steering wheel turning speed increases.

4. The steering apparatus according to claim 2, wherein, when the steering operation direction is a direction that reduces the understeer, the control unit decreases the amount of change of the second steering angle as the steering wheel turning speed increases.

5. The steering apparatus according to claim 2, wherein the control unit has a map in which the variable value, the steering speed, and the steering operation direction are correlated to the amount of change of the second steering angle or to a gain for determining the amount of change, and wherein the control unit determines the amount of change of the second steering angle based on the map.

6. A method for controlling a vehicle steering apparatus having a motor for changing a steering angle of steered wheels according to turning of a steering wheel, the method comprising:
   determining the steering angle of the steered wheels by superimposing a first steering angle based on a turning angle of the steering wheel and a second steering angle based on the activation of the motor on each other;
   adjusting the second steering angle for changing the ratio of the steering angle of the steered wheels to the turning angle of the steering wheel;
   calculating a variable value that continuously changes in accordance with the steering characteristic of the vehicle, based on any one of a difference value between an actual yaw rate and a target yaw rate, a difference value between an actual slip angle and a target slip angle, and a difference value between a front wheel slip angle and a rear wheel slip angle;
   changing, when the variable value indicates that the steering characteristic is understeer, the second steering angle such that the greater the understeer indicated by the variable value, the smaller the steering angle of the steered wheels relative to the turning angle of the steering wheel becomes; and
   correcting, when the differentiated value of the variable value indicates that the understeer is changing to increase, the variable value such that the greater the degree of change of the understeer indicated by the differentiated value, the greater the understeer indicated by the variable value becomes.

7. A vehicle steering apparatus for changing a steering angle of steered wheels according to turning of a steering wheel, the apparatus comprising:
   a variable transmission ratio device having a motor for steering the steered wheels, wherein the steering angle of the steered wheels is determined by superimposing a first steering angle based on a turning angle of the steering wheel and a second steering angle based on the activation of the motor on each other, and wherein the variable transmission ratio device adjusts the second steering angle, thereby changing the ratio of the steering angle of the steered wheels to the turning angle of the steering wheel; and
   a controller for calculating a variable value that indicates a steering characteristic of the vehicle based on the motion state of the vehicle, wherein, when the variable value indicates that the steering characteristic is understeer, the controller controls the variable transmission ratio device to change the second steering angle such that the greater the understeer indicated by the variable value, the smaller the steering angle of the steered wheels relative to the turning angle of the steering wheel becomes, and wherein, when the differentiated value of the variable value indicates that the understeer is changing to increase, the controller corrects the variable value such that the greater the degree of change of the understeer, the greater the understeer becomes.

* * * * *